(12) United States Patent
Clute et al.

(10) Patent No.: US 6,592,064 B2
(45) Date of Patent: Jul. 15, 2003

(54) SELF-LOCKING BELT ROLLER HAVING TWO RETRACTION FORCE LIMITING ELEMENTS

(75) Inventors: Günter Clute, Henstedt-Ulzburg (DE); Klaus-Peter Singer, Hamburg (DE); Enno Witfeld, Hamburg (DE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/896,098

(22) Filed: Jun. 29, 2001

(65) Prior Publication Data

US 2002/0066817 A1 Jun. 6, 2002

(30) Foreign Application Priority Data

Jun. 29, 2000 (DE) .......................................... 100 31 735

(51) Int. Cl.[7] .............................................. B60R 22/28
(52) U.S. Cl. ................................................... 242/379.1
(58) Field of Search ...................... 242/379.1; 280/805, 280/806; 297/470, 471, 472, 478

(56) References Cited

U.S. PATENT DOCUMENTS

| | | | | |
|---|---|---|---|---|
| 5,618,006 A | * | 4/1997 | Sayles | 242/379.1 |
| 5,934,597 A | * | 8/1999 | Ludwig | 242/379.1 |
| 5,975,451 A | * | 11/1999 | Kawamoto | 242/379.1 |
| 6,105,894 A | * | 8/2000 | Singer et al. | 242/379.1 |
| 6,216,972 B1 | * | 4/2001 | Rohrle | 242/379.1 |
| 6,241,172 B1 | * | 6/2001 | Fugel et al. | 242/379.1 |

FOREIGN PATENT DOCUMENTS

| | | |
|---|---|---|
| EP | 0791513 A1 | 11/1995 |
| WO | WO 96/32303 | 10/1996 |

* cited by examiner

Primary Examiner—John M. Jillions
(74) Attorney, Agent, or Firm—R W Becker & Associates; R W Becker

(57) ABSTRACT

A self-locking belt roller is provided and includes a belt winding shaft rotatably mountable in a housing, a profiled head, and a torsion rod which becomes operational to resist further extraction of a belt from the belt roller so as to effect thereby a first force limiting operation of the belt roller. The belt roller also includes a resistance facilitating element on the belt winding shaft or the profiled head and a deformation element for increasing the resistance force of the belt roller to further extraction of the belt either at the time before the actuation of the torsion rod to resist further belt unwinding or at the time during which the torsion rod resists further belt extraction. The deformation element is engaged by the resistance facilitating element during further rotation of the belt roller in a manner to increase the resistance of the belt roller to further extraction of the belt.

26 Claims, 8 Drawing Sheets

SELF-LOCKING BELT ROLLER HAVING TWO RETRACTION FORCE LIMITING ELEMENTS

BACKGROUND OF THE INVENTION

The present invention relates to a self-locking belt roller with a vehicle-sensitive and/or seatbelt-sensitive controllable locking device, the belt roller being provided with a first force limiting device in the form of a torsion rod connected, on the one hand, to the belt winding shaft and, on the other hand, to a special profiled head which is secured to the housing via a controllable blocking element, the belt roller further including an additional deformation element for increasing the resistance to belt withdrawal which is actuated at a location between the belt winding shaft and the profiled head before and/or during the actuation of the torsion rod.

A belt roller with the aforementioned features is described in WO 96/32303. To the extent that additional measures are already described in this publication, they relate to an increase in the restraining forces before the actuation and/or during the actuation of the torsion rod, so that the vehicle occupant still participates during the relatively low initial deceleration of the motor vehicle and later initially upon, for example, contact with an airbag, a reduced restraining force is effected via the actuated torsion rod, whereby this conventional arrangement is representative of the state of the art from which the present invention proceeds in that there is provided, between the belt winding shaft and the profiled head which is lockable onto the circumference of the belt winding shaft, a bendable bolt around the circumference of the belt winding shaft which during a relative movement or relative turning of the belt winding shaft with respect to the profiled head is first initially actuated and bends within a predetermined freedom of movement space before, due to the further relative turning, the force level of the torsion rod is actuated.

In connection with conventional belt rollers, the disadvantage still exists that the disposition of an additional deformation member in addition to the torsion rod requires as a prerequisite a radial overlapping of the belt winding shaft and the profiled head; furthermore, the arrangement of the bending bolt around the circumference of the belt winding shaft so as to permit the predetermined freedom of movement space for its bending is expensive and can be realized only with considerable effort.

SUMMARY OF THE INVENTION

The present invention offers a solution to the challenge of providing a belt roller having the afore-described state of the art characteristics which is improved therefrom in a manner such that the arrangement of an additional deformation member is realized in a simpler manner without construction restrictions.

The solution to this challenge is hereinafter described in connection with the advantageous embodiments and variations of the belt roller of the present invention.

The present invention proceeds from the basic concept that the deformation element has its one end engaged or hooked onto the belt winding shaft or onto the profiled head and is configured as a bending element which corresponds to the circumference of the belt winding shaft along its contour and, further, that the bending element has a dimensionally conforming cut out which is engaged by another component in the form of a resistance facilitating element arranged either on the profiled head or the belt winding shaft. In this manner, the present invention relies on the principle of actuating an additional deformation member, as well, in connection with the axially adjacent arranged belt winding shaft and profiled head, in the form of a bending element which is preferably configured as a steel band section and which is seated on the rear side of the belt winding shaft or on the profiled head and which, during a relative turning of the belt shaft and the profiled head, that itself is fixedly connected to the belt winding shaft upon actuation of a blocking element, is drawn through another component in the form of a non-rotating resistance facilitating element. With the thus-effected deformation work, the desired force limitation is performed.

In this connection, a configuration of a force limiting apparatus with a steel band section that is drawn through a resistance facilitating element, the steel band section being basically a bending element, is disclosed in EP 0 791 513 A1.

In accordance with one embodiment of the present invention, it is initially provided that the resistance facilitating element is configured in a non-rotating extension on either the profiled head or the belt winding shaft.

In this connection, in a first alternative embodiment of the present invention, it can be provided that the bending element is hooked onto the rear side of the belt winding shaft adjacent the profiled head and that the extension with the resistance facilitating element is fixedly mounted on the profiled head, whereby the bending element can be disposed in a recess or trough formed in the rear side of the belt winding shaft.

In accordance with a further alternative configuration of the present invention, it is provided that the bending element is suspended on the rear side of the profiled head which is adjacent the belt winding shaft and that the extension is disposed with the resistance facilitating element on the belt winding shaft.

In a further additional configuration of the present invention, it is provided that the bending element is disposed in an extension which is mounted in a non-rotating manner on the profiled head and that the resistance facilitating element is mounted on the belt winding shaft.

It can also be provided that the resistance facilitating element is configured on the rear side of the seat belt winding shaft neighboring the profiled head. The present invention can, in this connection, also be realized such that the resistance facilitating element is configured on a special shaft ring which is connectable with the belt winding shaft.

In a further configuration of the present invention, it is provided that the resistance facilitating element is arranged on the profiled head.

Within the scope of a preferred embodiment of the present invention, it is provided that a security ring is arranged between the belt winding shaft and the profiled head in the form of a roller bushing at a location between the belt winding shaft and the profiled head which effects a reduction of the friction which occurs between the belt winding shaft and the profiled head during a phase of the force limitation. It is provided that the security ring is formed with a rotation preventing axial projection which extends into the respective component and seats therein in order to secure the security ring for its security task. Furthermore, the security ring can include a radial portion operable to prevent displacement movement of the bending element out of its mounted disposition on the respective one of the belt winding shaft and the profiled head, whereby the radial piece is, additionally, a slotted angular element in the plane of the bending element having a slot which receives therein the bending element. In this manner, the security ring effects a sufficient interconnection of the bending element within the scope of its arrangement between the belt winding shaft and the profiled head.

To the extent that an embodiment of the present invention includes the bending element in a form in which the bending element has a uniform dimension along its length, the additional moment created by the bending element is constant. In accordance with a configuration of the present invention, a degressive force path can be adjusted by a pulling through of the bending element through the resistance facilitating element such that the bending element has, in a direction from its hook catch, either a decreasing material strength along its length or a decreasing width along its width; also, a combination of both of these measures is possible.

BRIEF DESCRIPTION OF THE DRAWINGS

The embodiments and configurations of the present invention are described hereinafter in connection with the Figures of the drawings, in which.

DETAILED DESCRIPTION OF THE PREFERRED EMBODIMENTS

Figure 1:
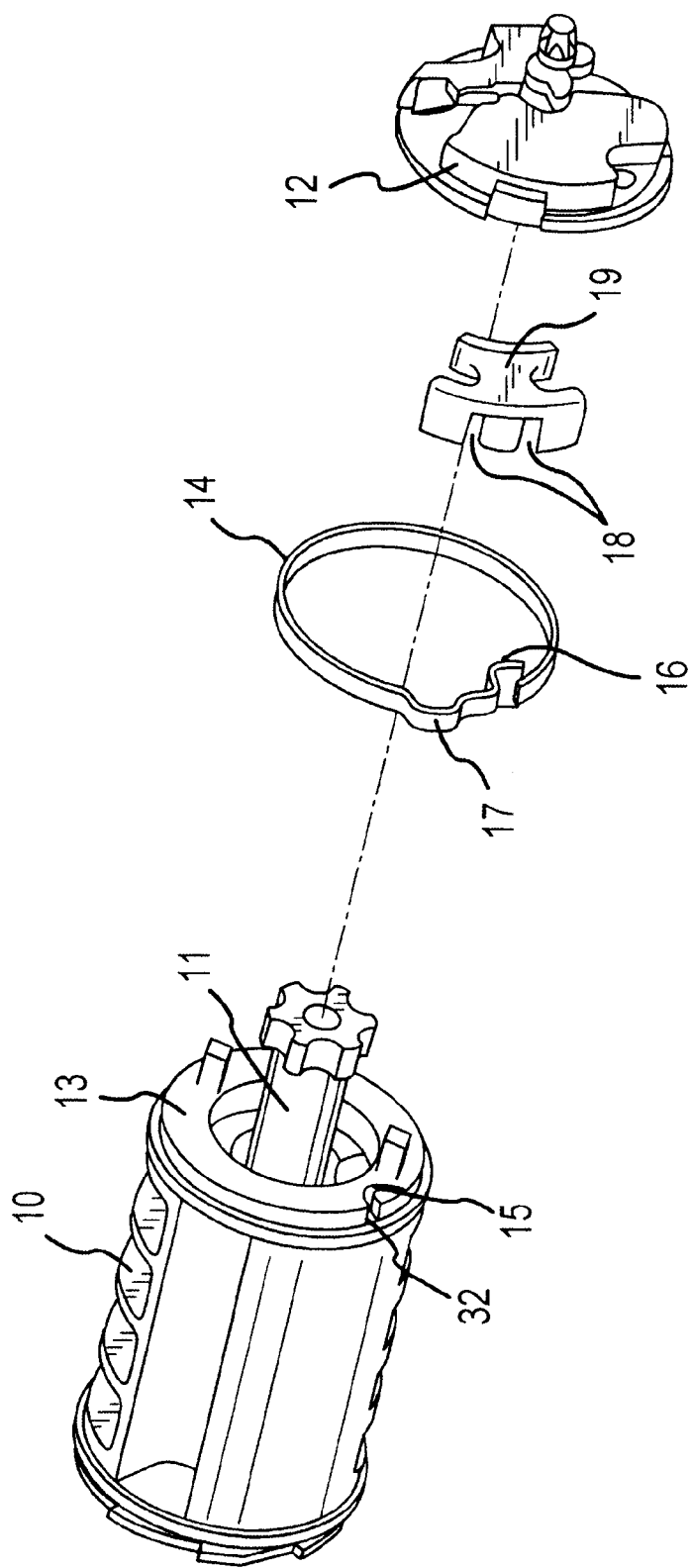
FIG. 1 is an exploded perspective view of a seatbelt roller having the thereon connected force limiting apparatus or device.

As seen in FIG. 1, one embodiment of the belt winding roller of the present invention includes a belt winding shaft 10 having a torsion rod 11 and a profiled head 12, the belt roller being a self-locking seatbelt roller which functions as is described in detail in connection with the prior art representative seatbelt roller described in WO 96/32303, which is hereby fully incorporated herein by reference thereto. In the embodiments and configurations described herein in connection with the figures of the drawings, a first force limiting device is so configured that the one end (not shown) of the torsion rod 11 is connected in a positive locking manner to the belt winding shaft 10 while the other end of the torsion rod extending outwardly from the belt winding shaft is connected in a non-rotating manner with the profiled head 12. When, in the course of a loading of the blocking system of the belt roller, there occurs a blocking of the profiled head 12, then a further belt extraction force urges the belt winding shaft 10 to further rotate, whereupon this relative movement effects actuation of the torsion rod.

A bending element 14 is arranged as a second, additional force limiter between the axially adjacent components—namely, the belt winding shaft 10 and the profiled head 12—and the bending element 14 is preferably comprised of a strip-shaped steel band section. One end of the bending element 14 is formed into a catch hook 16 which can be seated in a pocket 15 formed in the rear side 13 of the belt winding shaft 10, while the bending element otherwise is formed with a contour which corresponds to the circumference of the belt winding shaft 10 such that the bending element is disposable in a contoured trough or recess 32 formed in the rear side 13 of the belt winding shaft 10. The bending element 14 includes a pre-formed cut out or portion 17 extending radially outwardly from the general periphery of the bending element which is engaged by a resistance facilitating element 18 that is formed on an extension or insert 19, which itself is mounted in a non-rotating manner on the profiled head 12. The arrangement of these components is undertaken such that a further rotation of the belt winding shaft 10 relative to the profiled head 12 pulls the bending element 14 through the resistance facilitating element 18, which is mounted on the non-rotating profiled head 12, and the deformation work brought forth by this action effects a limitation of the retraction force or, respectively, a damping of the retraction force.

Figure 2:
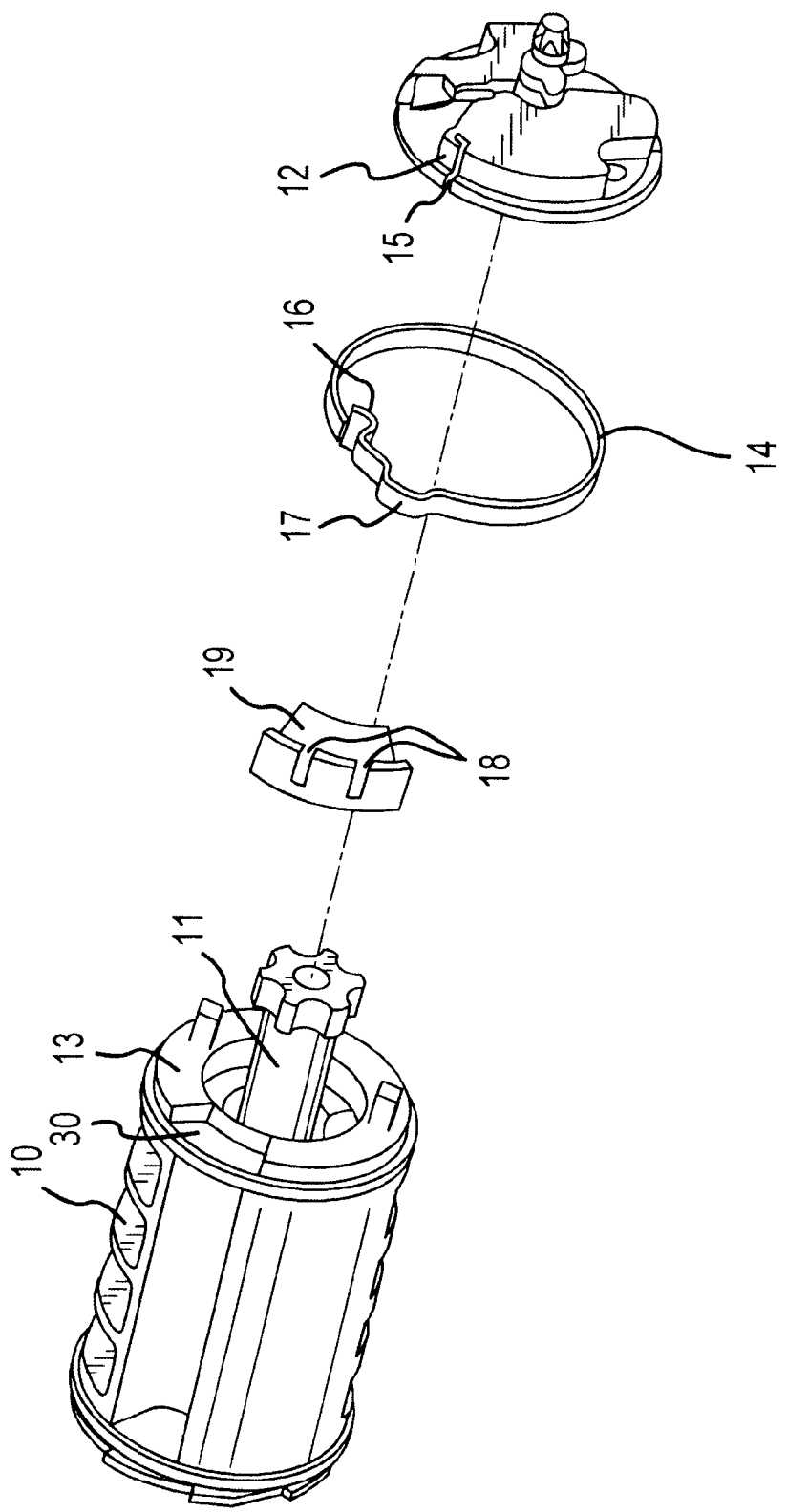
FIG. 2 is an exploded perspective view of the belt roller shown in FIG. 1 and showing the extension mountable in a fixed manner to the belt winding shaft.

As seen in FIG. 2, in another embodiment of the present invention, the belt winding roller is configured similar to the belt winding roller shown in FIG. 1 with the difference that the extension 19 is disposed with the resistance facilitating element 18 in a non-rotating manner in a recess 30 on the rear side 13 of the belt winding shaft 10 and the bending element 14 is disposed such that it is engaged by the pocket 15 formed on the profiled head 12.

Figure 3:
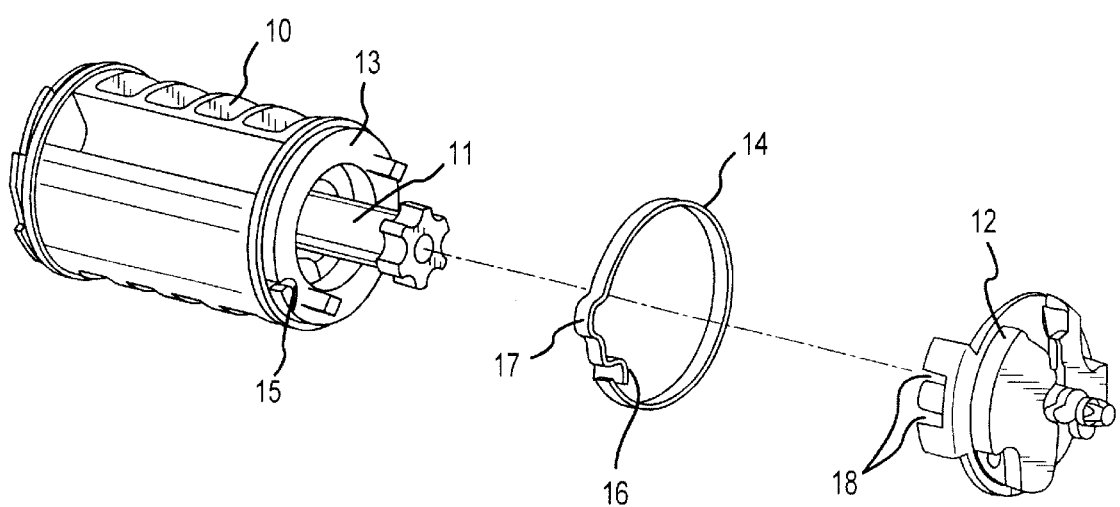
FIG. 3 is an exploded perspective view of another embodiment of the present invention and showing the resistance facilitating element formed on the profiled head.
Figure 4:
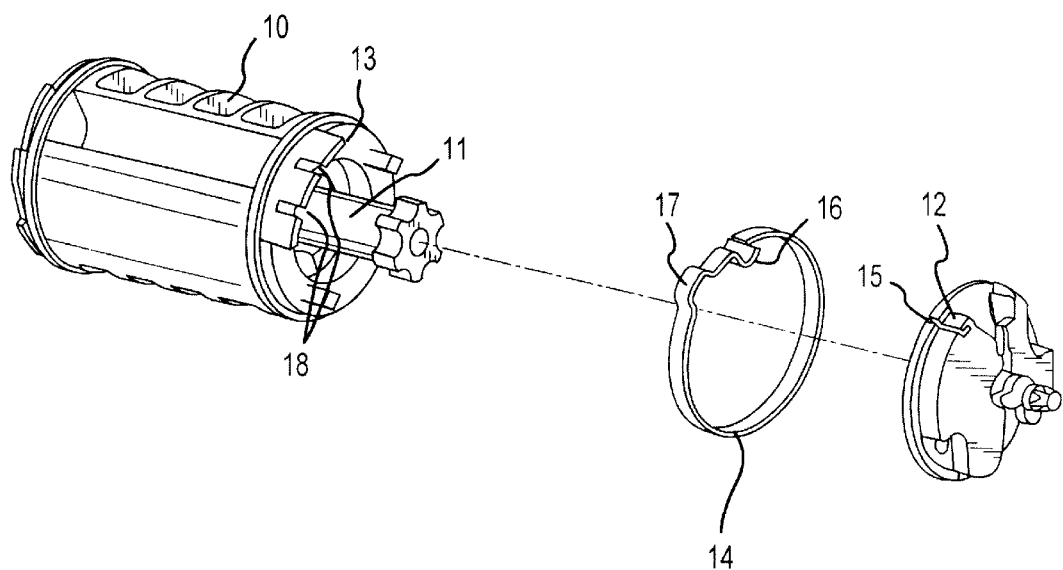
FIG. 4 is an exploded perspective view of a further embodiment of the present invention having a resistance facilitating element formed on the belt winding shaft and a bending element disposed directly on the profiled head.
Figure 5:
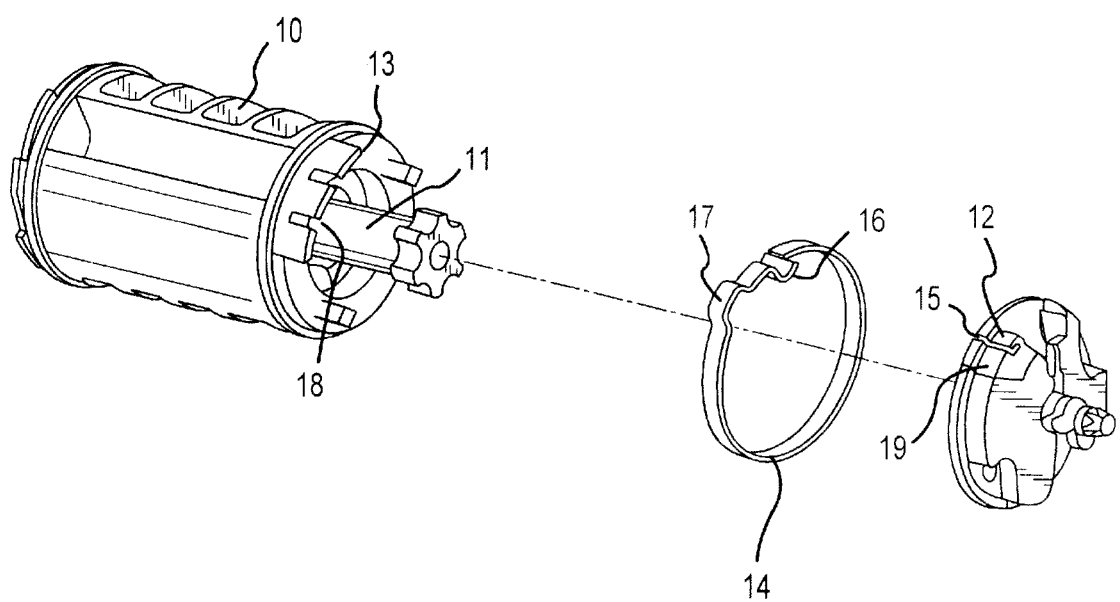
FIG. 5 is an exploded perspective view of a variation of the further embodiment of the present invention shown in FIG. 4 and showing the bending element mounted to an extension arranged on the profiled head.

As seen in FIG. 3, in another embodiment of the present invention, the belt winding roller is similar to the belt winding roller described with respect to FIG. 1 to the extent that the resistance facilitating element 18 is formed directly on the rear side of the profiled head 12 which is adjacent the belt winding shaft 10. In the same manner, the configuration of the belt winding roller shown in FIG. 4 corresponds to the configuration of the belt winding roller shown in FIG. 2 to the extent that the resistance facilitating element 18 is formed directly on the rear side 13 of the belt winding shaft 10. FIG. 5 shows a variation of the belt winding roller shown in FIG. 4 to the extent that the pocket 15 for engagement of the bending element 14 is not, as shown in the configuration shown in FIG. 4, arranged directly on the profiled head 12, but, instead, is a portion of the extension 19, which is formed for positive locking engagement with the rear side of the profiled head 12.

Figure 6:
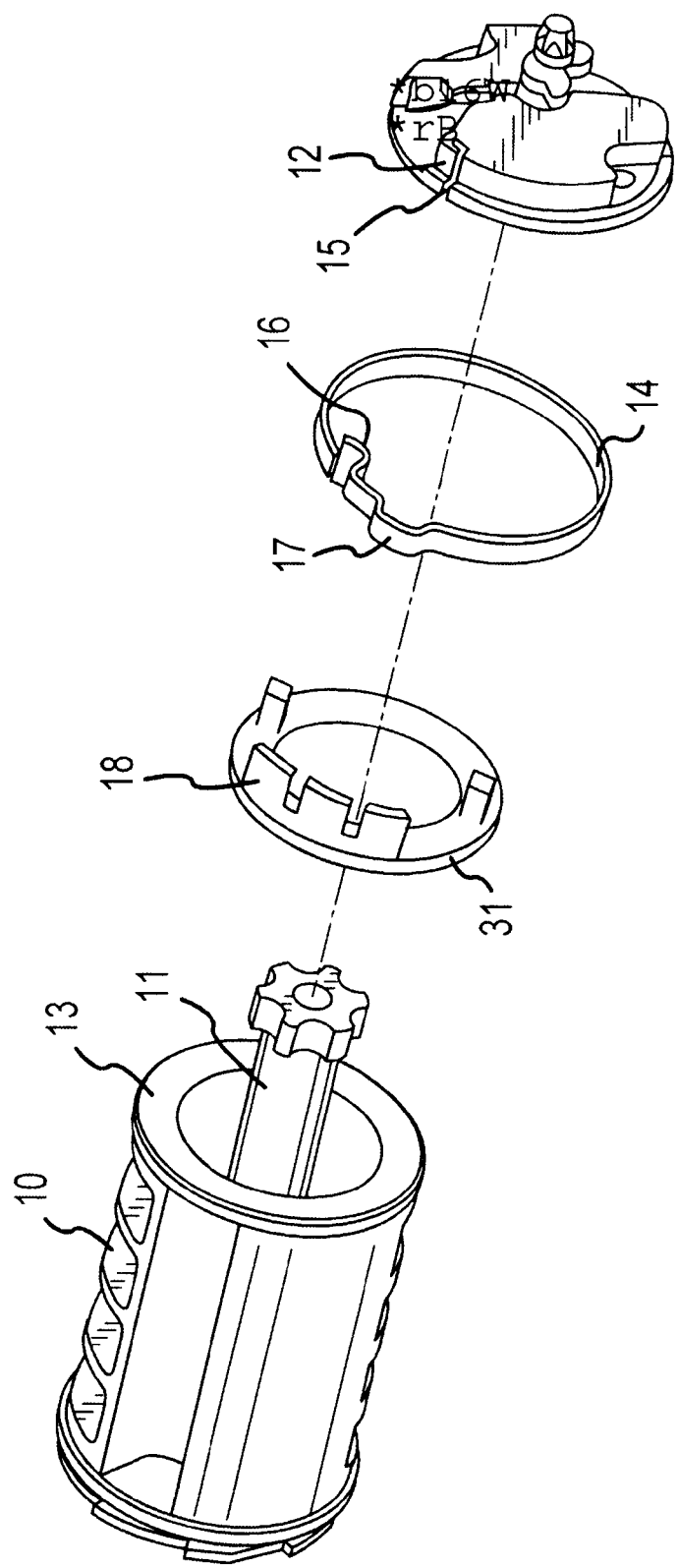
FIG. 6 is an exploded perspective view of a variation of the further embodiment shown in FIG. 4 with a resistance facilitating element formed in a special shaft ring.

As seen in FIG. 6, in a further variation of the belt winding roller, the resistance facilitating element 18 is a portion of a special shaft ring 31 which is connected with the rear side 13 of the belt winding shaft 10 by, for example, being threaded thereunto. The contour of the shaft ring 31 on the side thereof turned toward the profiled head 12 corresponds, in this regard, to the further configuration of the rear side 13 of the belt winding shaft 10 shown in FIG. 1.

Figure 7:
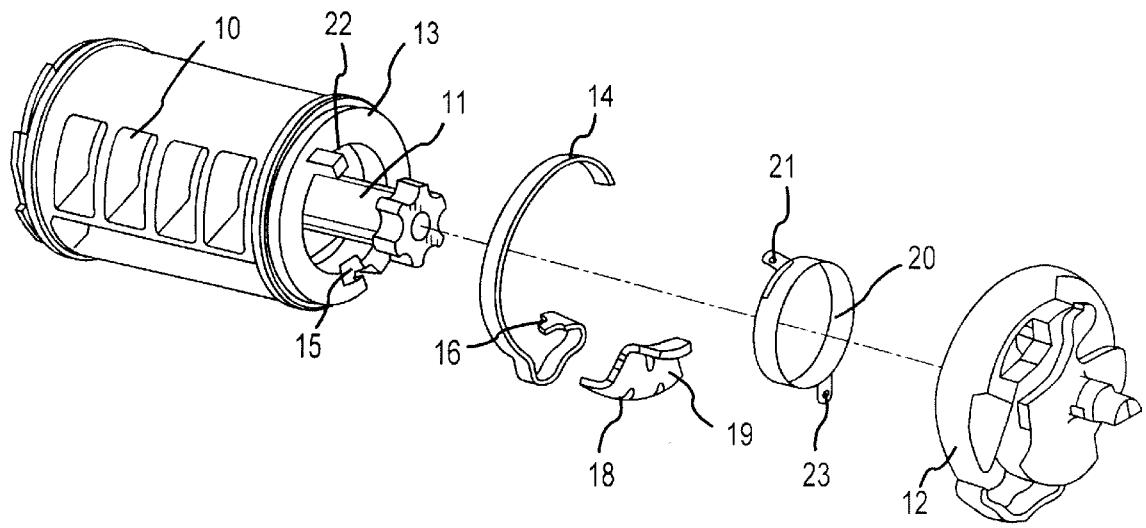
FIG. 7 is an exploded perspective view of the embodiment of the present invention shown in FIG. 1 and showing, additionally, an additional security ring.
Figure 8:
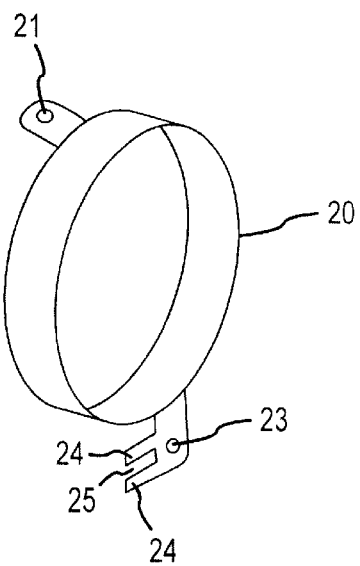
FIG. 8 is an enlarged perspective view of the security ring shown in FIG. 7.

As seen in FIG. 7, in this configuration of the belt winding roller, a security ring 20 is additionally provided which is arranged in the form of a roller bushing between the belt winding shaft 10 and the profiled head 12 and which provides a reduction or minimization in the friction which occurs between the belt winding shaft 10 and the profiled head 12 during the phase of force limitation. The security ring 20 is secured via an axial projection 21 which extends into a contoured trough or recess 22 formed in the rear side 13 of the belt winding shaft 10, such that the security ring 20 is secured against rotation. Furthermore, the security ring 20 has a projection 23 extending radially therefrom which serves as a displacement preventing feature and, in this connection, also ensures the security of the arrangement of the bending element 14 on the rear side 13 of the belt winding shaft 10, in that this projection prevents a possible axial displacement of the bending element 14. As can be seen in FIG. 8, in a further variation of the present invention, the radial projection 23 includes an angled portion 24 extending in the direction of the rear side 13 of the belt winding shaft 10 and having a slot 25 formed therein such that the bending element 14, which is arranged at the rear side 13 of the belt winding shaft 10, is received in the slot and is thereby secured against axial as well as radial displacement. Preferably, the security ring 20 is formed of sheet steel, whereby the friction which occurs is reduced in an advantageous manner.

Figure 9:
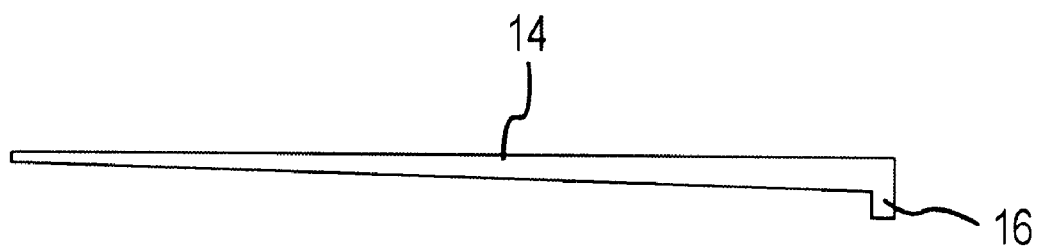
FIG. 9 is an enlarged front elevational view of the bending element in a flattened view which shows the decreasing width of the bending element along its length.
Figure 10:
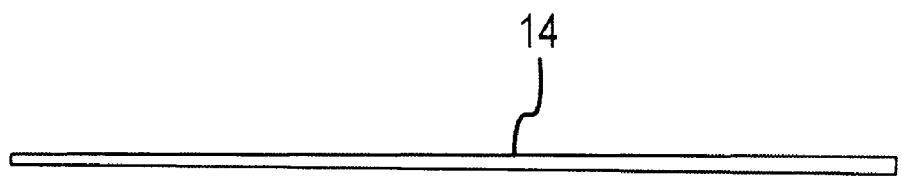
FIG. 10 is a front elevational view of the bending element in a flattened view and showing the bending element with a decreasing material strength along its length.

As seen in FIG. 9, in which the bending element 14 is shown in a flattened condition, the width of the bending element 14 reduces over its length starting from its end on which the catch hook 16 is formed while, as shown in FIG. 10, in another variation of the bending element 14, the material strength of the bending element 14 decreases along its length in the noted direction.

The features of the belt roller of the present invention disclosed in the foregoing description, the appended claims, the abstract of the disclosure, and the figures of the drawings can be provided individually or in desired combinations to effect a realization of the present invention in its various embodiments. Therefore, the specification incorporates by reference the disclosure of German priority document 100 31 735.9 of Jun. 29, 2000.

The present invention is, of course, in no way restricted to the specific disclosure of the specification and drawings, but also encompasses any modifications within the scope of the appended claims.

What we claim is:

1. A self-locking belt roller comprising:
   a belt winding shaft rotatably mountable in a housing, the belt winding shaft having a front side and a rear side;
   a profiled head;
   a torsion rod having a first end connected to the belt winding shaft and a second end connected in non-rotating manner to the profiled head which is moveable into a locking position with the housing in which rotation of the belt winding shaft is blocked and the torsion rod becomes operational to resist further extraction of a belt from the belt roller, whereby a first force limiting operation of the belt roller is effected thereby;
   a resistance facilitating element is formed on an extension which is disposed in non-rotating manner on the profiled head; and
   a deformation element in the form of a bending element for increasing the resistance force of the belt roller to further extraction of the belt at the time during which the torsion rod resists further belt extraction, the deformation element having one end disposed on the front face of the belt winding shaft on the side thereof adjacent to the front face of the profiled head and the deformation element being engaged by the resistance facilitating element during further rotation of the belt roller in a manner such that the resistance of the belt roller to further extraction of the belt is increased.

2. A belt roller according to claim 1, wherein the bending element is disposed for receipt in a recess formed in the end of the belt winding shaft.

3. A belt roller according to claim 1, wherein the resistance facilitating element is arranged on the belt winding shaft.

4. A belt winding roller according to claim 1, wherein the resistance facilitating element is formed on the rear side of the belt winding shaft which is adjacent the profiled head.

5. A belt winding roller according to claim 3, wherein the resistance facilitating element is formed on a shaft ring that is adapted to be connected to the belt winding shaft.

6. A belt winding roller according to claim 1, wherein a security ring is disposed between the belt winding shaft and the profiled head, the security ring being in the form of a roller bushing for reducing the friction which occurs between the belt winding shaft and the profiled head during the phase of the force limitation.

7. A belt winding roller according to claim 6, wherein the security ring includes an axial projection which is received in a recess in a selected one of the belt winding shaft and the profiled head to thereby insure a non-rotating securement of the security ring thereto.

8. A belt winding roller according to claim 6, wherein the security ring includes a radial projection operable as a displacement preventing component operable to prevent axial displacement of the bending element.

9. A belt winding roller according to claim 8, wherein the radial projection includes an angled portion formed in the plane of the bending element and having a slot formed therein for receiving therein the bending element.

10. A belt winding roller according to claim 1, wherein the bending element is formed with a uniform dimension along its length.

11. A belt winding roller according to claim 1, wherein the bending element has an increasingly reduced material thickness along its length in a direction starting from its end thereof engaged with the belt winding shaft.

12. A belt winding roller according to claim 1, wherein the bending element has an increasingly reduced width along its length in a direction starting from its end thereof engaged with the belt winding shaft.

13. A belt winding roller according to claim 1, wherein the bending element is comprised of a steel band strip.

14. A self-locking belt roller comprising:
   a belt winding shaft rotatably mountable in a housing, the belt winding shaft having a front side and a rear side;
   a profiled head;
   a torsion rod having a first end connected to the belt winding shaft and a second end connected in non-rotating manner to the profiled head which is moveable into a locking position with the housing in which rotation of the belt winding shaft is blocked and the torsion rod becomes operational to resist further extraction of a belt from the belt roller, whereby a first force limiting operation of the belt roller is effected thereby;
   a resistance facilitating element is formed on an extension which is disposed in non-rotating manner on the belt winding shaft; and a deformation element in the form of a bending element for increasing the resistance force of the belt roller to further extraction of the belt at the time during which the torsion rod resists further belt extraction, the deformation element having one end disposed on the front face of the profiled head on the side thereof adjacent to the belt winding shaft and the deformation element being engaged by the resistance facilitating element during further rotation of the belt roller in a manner such that the resistance of the belt roller to further extraction of the belt is increased.

15. A belt roller according to claim 14, wherein the resistance facilitating element is arranged on the belt winding shaft.

16. A belt winding roller according to claim 14, wherein the resistance facilitating element is formed on the rear side of the belt winding shaft which is adjacent the profiled head.

17. A belt winding roller according to claim 14, wherein the resistance facilitating element is formed on the profiled head.

18. A belt winding roller according to claim 14, wherein a security ring is disposed between the belt winding shaft and the profiled head, the security ring being in the form of a roller bushing for reducing the friction which occurs between the belt winding shaft and the profiled head during the phase of the force limitation.

19. A belt winding roller according to claim 18, wherein the security ring includes an axial projection which is received in a recess in a selected one of the belt winding shaft and the profiled head to thereby insure a non-rotating securement of the security ring thereto.

20. A belt winding roller according to claim 18, wherein the security ring includes a radial projection operable as a displacement preventing component operable to prevent axial displacement of the bending element.

21. A belt winding roller according to claim 20, wherein the radial projection includes an angled portion formed in the plane of the bending element and having a slot formed therein for receiving therein the bending element.

22. A self-locking belt roller comprising:
a belt winding shaft rotatably mountable in a housing, the belt winding shaft having a front side and a rear side;
a profiled head;
a torsion rod having a first end connected to the belt winding shaft and a second end connected in non-rotating manner to the profiled head which is moveable into a locking position with the housing in which rotation of the belt winding shaft is blocked and the torsion rod becomes operational to resist further extraction of a belt from the belt roller, whereby a first force limiting operation of the belt roller is effected thereby;
a resistance facilitating element is formed on the profiled head; and
a deformation element in the form of a bending element for increasing the resistance force of the belt roller to further extraction of the belt at the time during which the torsion rod resists further belt extraction, the deformation element having one end disposed on the front face of the belt winding shaft on the side thereof adjacent to the front face of the profiled head and the deformation element being engaged by the resistance facilitating element during further rotation of the belt roller in a manner such that the resistance of the belt roller to further extraction of the belt is increased.

23. A belt winding roller according to claim 22, wherein a security ring is disposed between the belt winding shaft and the profiled head, the security ring being in the form of a roller bushing for reducing the friction which occurs between the belt winding shaft and the profiled head during the phase of the force limitation.

24. A belt winding roller according to claim 23, wherein the security ring includes an axial projection which is received in a recess in a selected one of the belt winding shaft and the profiled head to thereby insure a non-rotating securement of the security ring thereto.

25. A belt winding roller according to claim 23, wherein the security ring includes a radial projection operable as a displacement preventing component operable to prevent axial displacement of the bending element.

26. A belt winding roller according to claim 25, wherein the radial projection includes an angled portion formed in the plane of the bending element and having a slot formed therein for receiving therein the bending element.

* * * * *